3,290,153
PROCESS AND APPARATUS FOR CONCENTRATING WORT
Peter D. Bayne, Milwaukee, Wis., and John L. Pahlow, Granada Hills, Calif., assignors to Jos. Schlitz Brewing Company, Milwaukee, Wis., a corporation of Wisconsin
Filed Sept. 18, 1964, Ser. No. 397,391
19 Claims. (Cl. 99—52)

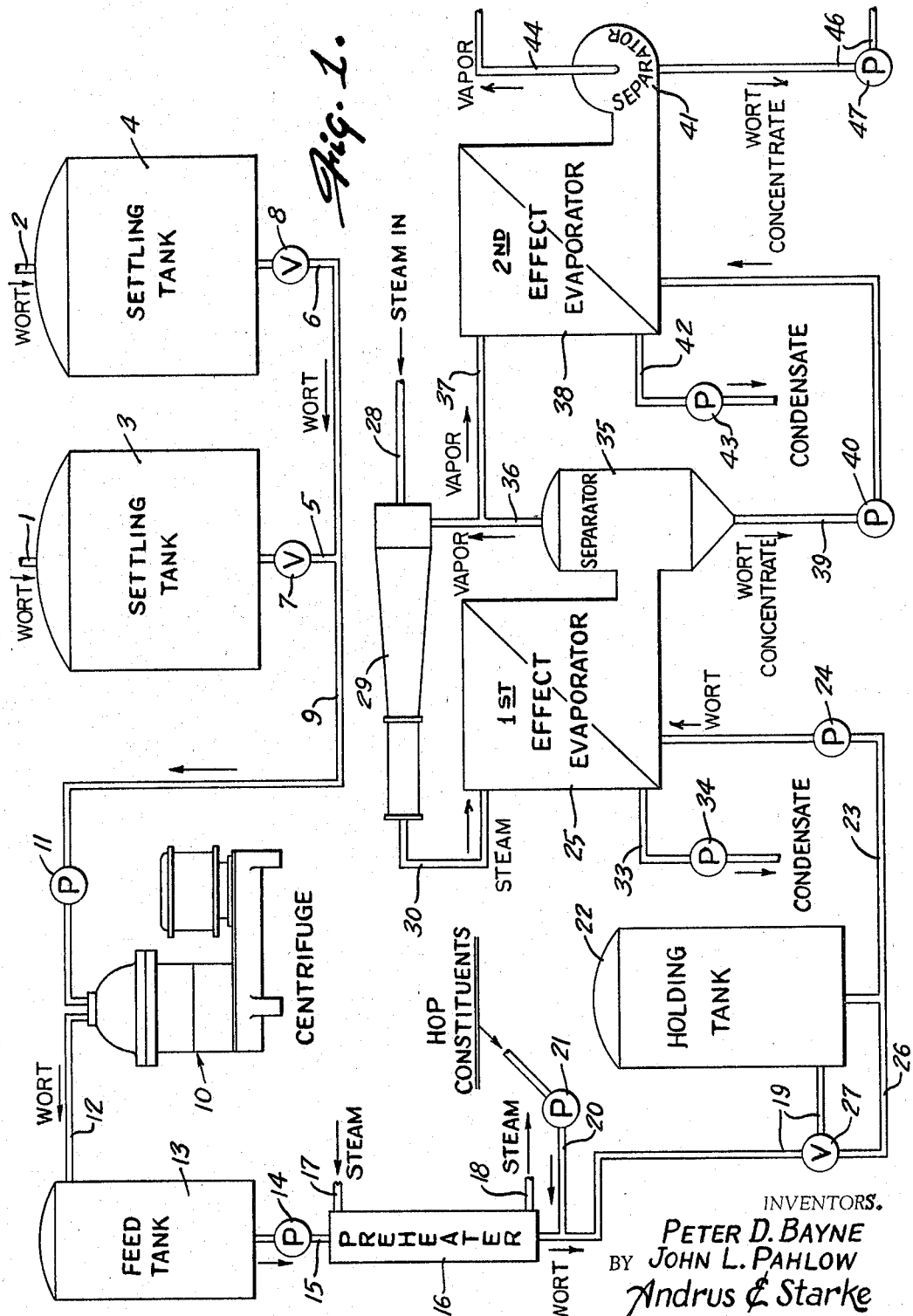

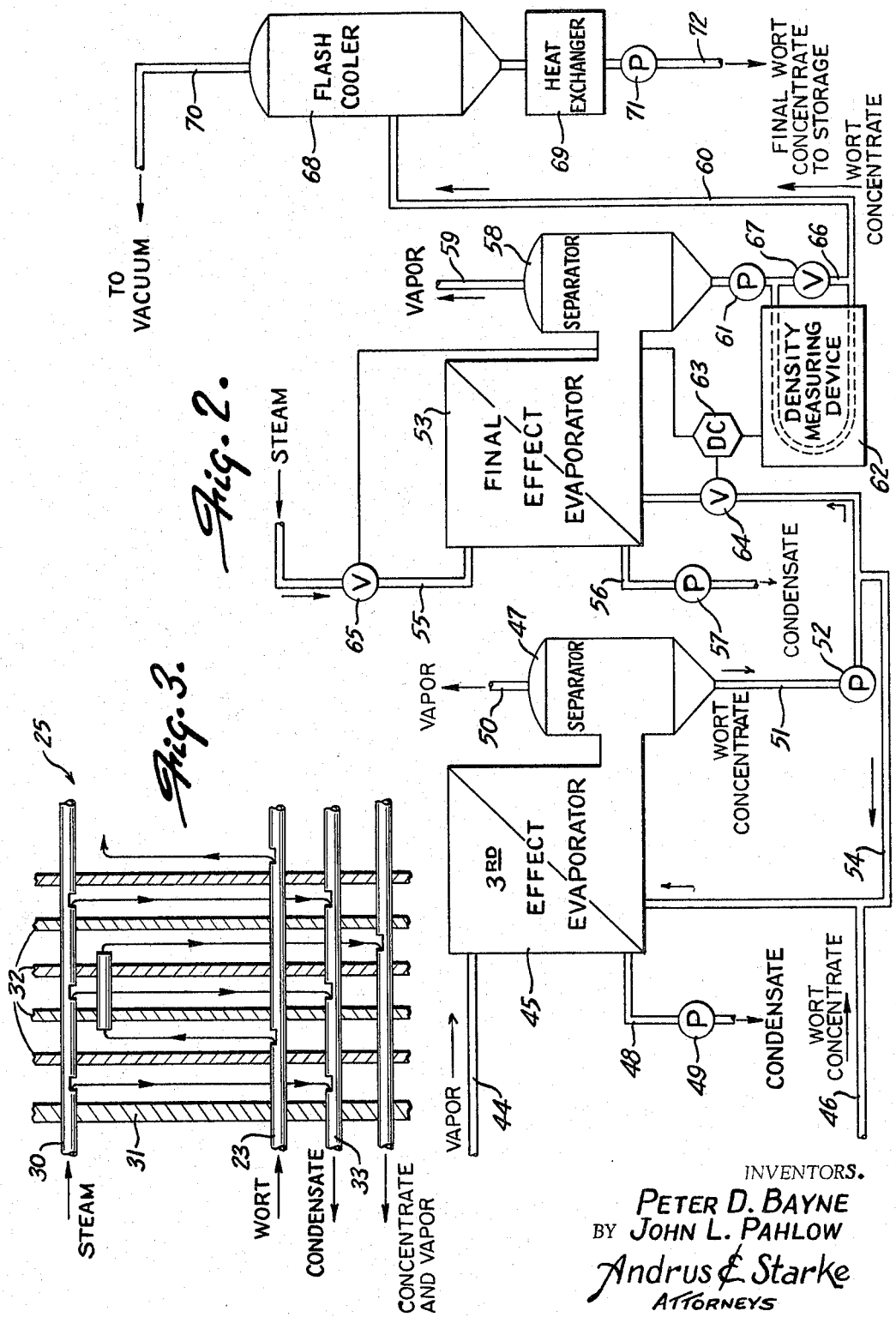

This invention relates to a process and apparatus for concentrating brewer's wort.

The concept of wort concentration has great potential in many areas and can offer advantages by increasing the production efficiency of existing plants, increasing production volume without a corresponding increase in capital expenditure, and providing a simplification of both production processes and control of product uniformity without sacrificing quality of product.

More specifically, concentrated wort provides several distinct advantages. Brewhouse equipment generally works at peak capacity for only a few months of the year. By concentrating wort during off-season periods, a more efficient use of the facilities results, so that the brewhouse equipment can be used more efficiently throughout the year.

In addition, concentrated wort can be shipped to distant points where it can be reconstituted, fermented and finished in plants which could be built at relatively low cost, because they would not require the expensive grain handling and brewhouse equipment. Moreover, weight having would be realized by shipping the wort concentrate, as opposed to shipping malt and raw grains required for conventional brewing.

The wort concentrate concept can also be employed in a manner such that the wort producing plant and wort concentrating plant are located in a barley growing country in conjunction with a continuous malting facility. The wort concentrate produced at this centralized plant could then be shipped to relatively small fermentation and finishing plants.

As an additional advantage, the wort concentrate provides an alternate approach to the problems that some brewers have attempted to solve by freeze concentration of beer. Wort concentrate, because it does not contain alcohol, does not present the legal ramifications which accompany freeze concentrated beer.

In the past, efforts have been made to concentrate wort, but the previous methods have imparted a color gain to the wort and seriously altered the flavor which provided an unsatisfactory reconstituted wort and processed beer.

The present invention is directed to a continuous high-capacity process for the concentration of wort. The resulting concentrate, having a solids content of about 80%, is sufficiently fluid to pump, meter, transport and store in enclosed tank systems. In addition, the wort concentrated by the process of the invention remains biologically sound without refrigeration and can be readily reconstituted without color gain, loss of hop bitter, or alternation of flavor.

According to the process of the invention, hot wort is alternately fed into a pair of settling tanks and the wort is held in the tank for a given period of time to permit the trub to settle and is then decanted and fed to a centrifuge which serves to remove any remaining trub from the wort. From the centrifuge, the hot wort is transferred to a balancing or feed tank and is subsequently fed to a pre-heater where it is heated to maintain a temperature of about 210° F. The wort then flows to a holding tank and is held for a short period of time at the pre-heated temperature to increase the utilization of the hop constituents. Following the holding period, the wort is pumped to the first of a series of a continuous film evaporators where the wort is concentrated in stages and is discharged from the last evaporator effect with a solids content of about 80%. The concentrated wort is then immediately flash-cooled to a temperature of below 105° F. and subsequently transferred to storage tanks or vessels.

The process of the invention, which includes the continuous film evaporation under high temperature and short holding time conditions, prevents degradation or color gain of the wort. On reconstitution, identical or organoleptic properties of the original wort are obtained.

The process of the invention utilizes a continuous flow of wort which is obtained by use of the pair of hot wort settling tanks in combination with the centrifuge so that a continuous supply of wort is available. Thus, it is not necessary to cease operation while waiting for a new batch of wort.

A provision is also made in the process for automatically adding hop constituents to the wort in the holding tank. A portion of the hop constituents will be lost during the concentrating process, and to compensate for this loss, a predetermined amount of hop constituents may be empirically added during the concentration process.

In addition, the process employs a density control mechanism which accurately regulates the final specific gravity or concentration of the wort. The wort being discharged from the finishing evaporator passes through the density control mechanism which regulates the heating medium used in the evaporator so that a uniform degree of wort concentration is obtained.

Other objects and advantages will appear in the course of the following description.

The drawings illustrate the best mode presently contemplated of carrying out the invention.

In the drawings:
FIG. 1 is a partial flow sheet of the process of the invention;
FIG. 2 is a continuation of the flow sheet shown in FIG. 1; and
FIG. 3 is a shematic representation of a plate-type, continuous film evaporator which can be used in the process.

FIGS. 1 and 2, in combination, are a flow sheet of the process of the invention. According to the process, hot wort from the brewhouse is pumped alternately through lines 1 and 2 to settling tanks 3 and 4. The wort contains a quantity of trub or "hot break" which is a mass of coagulated tannin-protein complexes. The quantity of the trub in wort depends on various factors, such as the type and amount of malt used, the sparging method employed, the amount of hops and the boiling intensity of the wort. The trub is substantially removed or separated from the wort in tanks 3 and 4 by sedimentation. In addition to the sedimentation of the trub, the settling period also contributes significantly to beer bitterness and color levels due to the generation of isohumulone during the period.

Discharge lines 5 and 6 are connected to the settling tanks 3 and 4, respectively, and flow of the wort within lines 5 and 6 is controlled by valves 7 and 8. Lines 5 and 6 are connected through line 9 to a centrifuge 10 and the wort is pumped through line 9 by pump 11. The centrifuge 10 serves to remove the remaining trub from the wort. The hot, clear wort being discharged from the centrifuge 10 passes through line 12 to a feed or balancing tank 13.

The use of the two hot wort settling tanks 3 and 4, in combination with the centrifuge 10, provides a continuous supply of hot, clear wort to the feed tank 13. In the normal brewhouse operation, the hot wort comes down in batches at given intervals such as every hour, and settling tanks 3 and 4 are each designed with sufficient capacity to hold a batch of hot wort from the brewhouse. In practice, a batch of hot wort from the brewhouse is pumped into one of the settling tanks 3 and 4 and the next batch of wort is fed to the other of the settling tanks. The wort is held in each tank for a total two-hour period, with the wort being allowed to settle for a period of one hour and being drained from the tank during the second hour, so that at the end of the two-hour period, the tank is empty and in condition to receive a second batch of hot wort from the brewhouse. As the one-hour settling period is not sufficient to provide a completely clear wort, the centrifuge 10 is employed which removes the remaining trub and provides a clear, hot wort which is fed to the feed tank 13.

As an alternative method of providing a continuous stream of clear wort for the evaporation, a batch of wort, after hop separation, is fed to one of the settling tanks and continuously pumped from the tank to the centrifuge 10 and continuously centrifuged to remove the suspended trub. The next batch of wort is fed to the other of the tanks and this batch is then continuously pumped to the centrifuge. With this method a continuous flow of clarified wort is provided although there is no settling period in the tanks 3 and 4.

The clear, hot wort is continuously withdrawn from the feed tank 13 by pump 14 in line 15 and fed to a preheater 16. In the pre-heater, the hot wort is flashed to a temperature in the range of 185° to 230° F., and generally about 200° F., by steam or other heating media. The steam is introduced into the pre-heater through line 17 and is withdrawn from the pre-heater through line 18. The heated wort is withdrawn from the pre-heater through line 19.

It has been found that a relatively constant 6% loss in isohumulone content occurs between the reconstituted wort concentrate and the corresponding conventionally produced wort. This loss in isohumulone content tends to produce a lighter, less bitter reconstituted beer. To compensate for this loss of isohumulone, a predetermined amount of hop constituents may be metered into the hot wort line during the process. As shown in FIG. 1, the hop constituents are added to the wort in line 19 through line 20 by a metering pump 21.

While the hop constituents are shown as being added to the line 19, it is conemplated that the top constituents can be added in other locations in the wort concentration flow path, such as the discharge of the finishing evaporator.

Following the pre-heating, the hot wort is fed through line 19 to a holding tank 22, and held at the pre-heated temperature for a period up to 30 minutes and for most operations, 1 to 6 minutes.

The flow rate of the wort through the system, as well as the capacity of the holding tank 22, determines the time the wort is held in tank 22. Holding the wort at the pre-heated temperature serves to increase the utilization of the hop constituents and also improves the thermal economy of the system.

The wort enters the settling tanks 3 and 2 at a temperature of about 190 to 200° F. and during the holding period and draw-off from the settling tank, the wort cools considerably to a temperature of about 180 to 188° F. With the use of the preheater 16 and holding tank 22, it is possible to increase the temperature so that the wort is fed to the first evaporator at a temperature of 200 to 210° F. This increase in temperature and holding period not only improves the thermal economy of the system, but also increases the rate of isohumulone isomerization so that up to 1.5 p.p.m. of isohumulone can be gained, which aids in compensating for the loss of isohumulone which occurs in the overall process.

Following the holding period, the wort is pumped from the holding tank 22 through line 23 by pump 24 to the first effect evaporator 25. In some situations, it may be desired to eliminate the holding time for the wort and thus, a by-pass line 26 is provided which connects the line 19 directly with line 23 and bypasses the holding tank 22. A three-way valve 27 is interconnected between lines 19 and 26 and directs the flow of fluid either into the holding tank 22 or through the by-pass line 26.

The evaporator 25 is a continuous film-type evaporator in which the wort and a heating medium, such as steam, flow countercurrently in the form of continuous films on opposite surfaces of baffle plates or tubes. The evaporation process is normally carried out under vacuum conditions with the pressure in the evaporators being less than atmospheric so that the vaporization temperature of the aqueous constituent of the wort will be less than 212° F. The vacuum in the series of evaporators is progressively increased so that the final effect evaporator has the greatest vacuum.

Steam from a suitable supply source is passed through line 28 to a thermo-compressor 29 and the steam is then conducted through line 30 to the first effect evaporator 25. As previously mentioned, the evaporator 25 is a continuous film type and FIG. 3 is a diagrammatic showing of a typical plate-type evaporator which can be employed. The evaporator 25 consists of a pair of headers 31 which enclose a series of gasketed plates 32. Steam entering the evaporator from line 30 passes downwardly along one surface of each of the plates 32, while the wort entering the evaporator through line 23 flows upwardly along the opposite surface of each plate in the form of a continuous film. Suitable baffles are provided on the surfaces of the plate to produce the desired continuous film flow pattern of steam and wort on the plate surfaces. Heat is transferred from the steam to the film of wort to vaporize a portion of the wort so that the wort is concentrated in the first effect evaporator from an incoming concentration of about 12% solids to an outgoing concentration of about 19.5% solids.

The rising-falling film system used in the evaporator is important to the process. The wort moving up to the plate or tube is relatively fluid and is able to be propelled up the plate surface by expanding water vapor pressure as the pressure drops. The partially concentrated wort then drops over the top of the plate and descends, and on the downward path of movement, gravity assists the flow of the more viscous wort, thereby increasing its velocity.

The steam condensate is withdrawn from the evaporator 25 through line 33 by pump 34 and the concentrated wort, as well as the vapor, are conducted from evaporator 25 to the first separator 35 where the vapor is separated from the partially concentrated wort. A portion of the vapor, which consists mostly of steam with some volatile essential oils entrained therein passes upwardly through line 36 to the compressor 29 which serves to recompress the vapor and combine it with the steam. A second portion of the vapor passes through line 37 to the second effect evaporator 38, and serves as the heat source for the second effect evaporation.

The condensate 33 may contain some volatile essential oil constituents due to the fact that a portion of the vapor is returned through line 36 to the steam line 30 and the constituents can be recovered by classic isolation techniques and returned to the concentrate. The volatile oils are normally returned to the concentrate after the finish effect evaporation.

The partially concentrated wort is pumped from the separator 35 through line 39 by pump 40 to the second effect evaporator 38.

The second effect evaporator 38 is similar in structure to the first effect evaporator 25 and the hot vapor entering the evaporator through line 37 and the concentrated wort entering the evaporator through line 39 flow as continuous films on opposite surfaces of each plate to thereby transfer heat to the wort and provide an additional concentration. The concentrated wort having a concentration of about 30% solids along with the vapor from the second effect evaporator 38 flows to the separator 41, while the condensate from the evaporator 38 is withdrawn through line 42 by pump 43. The separator 41 serves to separate the concentrated wort and the vapor. The vapor from the separator 41 passes through line 44 to the third effect evaporator 45, while the wort concentrate is withdrawn from the separator through line 46 and is pumped by pump 47 to the evaporator 45.

The condensate being withdrawn through line 42 contains volatile essential oil constituents, and these constituents can be recovered by standard isolation techniques and subsequently returned to the concentrate.

The evaporator 45 is similar in structure to evaporators 25 and 38 and the partially concentrated wort is passed as a continuous film in heat exchange relation with the steam to thereby further concentrate the wort. The concentrated wort and vapor pass to the third effect separator 47 while the steam condensate is withdrawn through line 48 and is pumped by pump 49 to a storage location. The vapor, which consists mostly of steam and some essential oil, is withdrawn from the separator through line 50 and flows to a condenser, not shown.

The wort concentrate having a solids content of about 67% is withdrawn from the separator 47 through line 51 and is moved by pump 52 to the fourth or finishing evaporator 53. In addition, a portion of the wort flowing within line 51 is returned to the third effect evaporator 45 through line 54. Recirculation of wort through line 54 enables the plates in the third effect evaporator 45 to be flooded with wort at all times. As the wort is highly viscous at this stage, there is a tendency for the wort flowing over the plates, not to be in the form of a continuous film with the result that some scorching or burn-on may occur. Thus, a portion of the concentrated wort is returned through line 54 to the third effect evaporator to insure that the plates will be flooded and that a uniform continuous film of wort is obtained on the evaporator plates.

The fourth effect evaporator 53 is similar in structure to the other evaporators and steam is introduced to the evaporator through line 55. As previously described, the steam flows as a continuous film on one surface of each plate, while the wort concentrate flows in the form of a continuous film on the opposite surface of each plate. The steam condensate is withdrawn through line 56 and removed by pump 57 to a storage location, while the concentrated wort and vapor passes to a separator 58. The vapor is withdrawn from the separator 58 through line 54 and is pumped to a suitable condenser, while the concentrated wort having a solids content of about 80% is withdrawn through line 60 by pump 61 and is passed through a density control mechanism 62. The density control mechanism is a standard device which continuously weighs a given volume of the wort and provides a continuous determination of the density of the concentrated wort. The density control mechanism 62 is operably connected through control mechanism 63 to a valve 64 in wort line 51 and also is operably directed to a valve 65 in steam line 55. The control mechanism 63 serves to control the valves 64 and 65 to vary the relative amounts of the wort and steam to provide a constant density for the concentrated wort being discharged from the finish effect evaporator.

As the density control mechanism 62 generally does not have sufficient capacity to continuously receive the entire stream of wort, a portion of the wort is by-passed through line 66. The amount of wort being by-passed can be controlled by valve 67 in line 66.

The concentrated wort then flows to a flash cooler 68 where the concentrate is then cooled to a temperature below 105° F. and preferably below 85° F. The cooling can be accomplished by any conventional cooling device, and it has been found that the desired cooling rate for the viscous concentrate can be satisfactorily produced by using an evaporative cooler 68 in combination with a scraped surface heat exchanber 69, known as a Votator. Flash cooler 68 may be connected to a vacuum pump through a line 70 so that the flash cooler is under a pressure less than that of the finish evaporator 53.

The wort concentrate enters the flash cooler 68 at a temperature of about 125° F. and the reduction in pressure in the flash cooler produces an evaporative effect which chills the concentrate to a temperature in the neighborhood of 105° F. Following the flash cooling, the concentrate is pumped through the heat exchanger 69 by pump 71 and is then conducted through line 72 to a storage tank. Heat is transferred from the concentrate to the cooling medium flowing in heat exchanger 69 so that the concentrate has a temperature of about 85° F. as it leaves the heat exchanger. It is important that the concentrated wort be chilled immediately to a temperature below 105° F. for holding the concentrated wort at a temperature about 105° F. for any extended period will result in serious color alteration and loss of amino acid content vital for efficient fermentation. This cooling should be accomplished in as short a period as practical and definitely within a period of 10 minutes.

It is necessary that the final concentrate have a solids content above 78% by weight and preferably above 80% in order to prevent yeast and bacteria infection. The wort concentrate with this solids content can be safely shipped and stored without microbiological growth.

A specific example of the process of the invention is as follows:

Approximately twenty barrels of wort at a temperature of 205° F. and having a trub content of 0.2% by weight was pumped from the brew kettle through the hops separator into one of a pair of 500 barrel settling tanks. Five minutes after the wort came into the tank, a Westfalia automatic centrifuge was started and clear wort pumped through the centrifuge into the evaporator feed tank at the rate of 67 g.p.m. Thusly, wort was run in this manner with continuous trub separation until the next brew was ready in the second wort settling tank, approximately two hours later. By use of a brewing system of this nature, in combination with a centrifuge, a continuous flow of wort was available for evaporation. The wort discharged from the settling tanks ranged in temperature from 205° F. to 180° F. with a constant solids content of 12% by weight.

The clear wort was continuously pumped from the 310 gallon feed or balancing tank to a preheater where the wort was heated to a temperature of 210° F. by means of 100 p.s.i.g. steam flowing at the rate of 880 lbs./hr.

The pre-heated wort was then pumped to a 400 gal. holding tank and held in the tank for a period of one minute.

Following the holding period, the wort at a temperature of 210° F. was fed to the first of a series of single-pass, rising-falling film, plate evaporators manufactured by APV, Ltd. The first effect evaporator was operated at a vacuum of 11 inches of Hg. Steam at a pressure of 100 p.s.i.g. and a flow rate of 12,800 lbs. per hour was fed through a 10″ x 10″ thermo-compressor to the first effect evaporator.

The vapor resulting from the first effect evaporation was separated from the partially concentrated wort in a 60-inch vertical duplex separator, and a portion of the vapor at a flow rate of 6,400 lbs. per hour was recirculated to the thermo-compressor, while a second portion of the steam at a flow rate of 7,145 lbs. per hour was fed to the second effect evaporator for use as the heating medium.

The partially concentrated wort having a solid content of 19.5% by weight and a temperature of 160° F. was pumped from the separator to the second effect evaporator which operated at a vacuum of 16 inches of Hg. The steam in the second effect evaporator was at a temperature of 182° F.

The vapor from the second effect evaporation was separated from the partially concentrated wort in a 60-inch horizontal separator and the vapor at a flow rate of 7,580 lbs./hr. was fed to the third effect evaporator and used as the heating medium for the third effect evaporation. The partially concentrated wort having a solids content of 30% and at a temperature of 120° F. was pumped to the third effect evaporator which operated at a vacuum of 25 inches of Hg.

The resulting vapor was separated from the partially concentrated wort in a 72-inch vertical duplex separator and the steam was conducted to a condenser. The wort at a concentration of 67.2% solids and at a temperature of 120° F. was circulated at a flow rate of 6,300 lbs./hr. to the finish effect evaporator. Steam at a pressure of 100 p.s.i.g. and a temperature of 190° F. was introduced to the finish effect evaporator at a flow rate of 1040 lbs./hr. The evaporator operated under a vacuum of 26 inches of Hg.

The vapor from the finish evaporator was separated from the concentrated wort in a 44-inch vertical separator and fed to a condenser, while the concentrated wort was pumped as a continuous stream through a density control recorder which continuously weighed a given volume of the concentrated wort and was operably connected to the wort flow line and steam flow line of the finish effect evaporator. The wort leaving the finish effect evaporator had a solids content of 80% and a temperature of 120° F. and was pumped at a flow rate of 5,300 lbs./hr.

Following the final finish effect evaporation, the concentrated wort was pumped to a flash cooler operating under a vacuum of 27 inches of Hg where the concentrate was flashed to a temperature of 105° F. Following this, the cooled wort was pumped through a Votator heat exchanger in heat exchange relation to the cooling water at a temperature of 34° F. where the temperature of the wort was reduced to 85° F. The concentrated wort at a temperature of 85° F. and having a solids content of 81% by weight was then pumped to a storage tank for storage and shipment. On reconstitution, the wort showed substantially identical properties to those of conventionally treated wort.

The wort is concentrated in a continuous flow process which can be operated continuously without shutdown. As the total time involved, from the instant the wort is withdrawn from the settling tanks 3 and 4 to the time it leaves the heat exchanger 69, is less than 10 minutes and usually only about 3 minutes, the problems of degradation or color gain of the wort are virtually eliminated. In addition, the evaporation serves to cool the wort from a temperature of about 215° F. to 105° F. so that the cost of evaporation is partially offset by the savings in the normal cost of cooling the wort.

A uniformity of concentration is assured by the density control mechanism which accurately regulates concentration of the wort by varying the relative proportions of steam and wort entering the final effect evaporator. This feature, along with the short duration of the concentrating process, enables the reconstituted wort to have identical properties to that of the original wort, so that the resulting beer is substantially identical in flavor and appearance to that of beer produced by conventional brewing processes.

Various modes of carrying out the invention are contemplated as being within the scope of the following claims particularly pointing out and distinctly claiming the subject matter which is regarded as the invention.

We claim:

1. In a process of concentrating brewers' wort, the steps comprising passing hot wort substantially free of suspended solids through a series of evaporative effects in the form of a substantially continuous film in heat exchange relation with a heating medium in a period of less than 10 minutes to concentrate the wort to a solids content greater than 78% by weight, and thereafter immediately cooling the concentrated wort to a temperature below 105° F.

2. In a continuous process of concentrating brewers' wort, the steps comprising continuously preheating a stream of wort substantially free of suspended solids to a temperature in the range of 185° to 230° F., evaporating the preheated wort by passing the wort through a series of evaporative effects in the form of a substantially continuous film in heat exchange relation with a heating medium to concentrate the wort to a solids content greater than 78% by weight, thereafter immediately cooling the concentrated wort to a temperature below 105° F., and maintaining the flow of said wort at a rate sufficient to perform said steps of preheating, evaporating and cooling in a period less than 10 minutes.

3. The process of claim 2, including the step of continuously adding hop constituents to the stream of wort to maintain the hop constituents at a predetermined concentration in said wort stream.

4. The process of claim 2 in which the wort is maintained under a pressure less than atmospheric during the cooling step.

5. In a continuous process of concentrating wort, the steps comprising alternately feeding batches of hot wort from a brewhouse to a pair of settling tanks, holding the wort in each tank for a period of time sufficient to permit a substantial portion of suspended trub material to settle from the wort, withdrawing the wort from one tank while wort is being fed to the other tank and continuously passing the wort through a mechanical separator to remove the remaining suspended trub material from the wort and provide a wort substantially free of suspended matter, passing the substantially clear wort through a series of evaporative effects in the form of a substantial continuous film in heat exchange relation with a heating medium to concentrate the wort to a solid content greater than 78% by weight, and thereafter cooling the concentrated wort to a temperature below 105° F.

6. In a continuous process of concentrating wort, the steps comprising alternately feeding batches of hot wort from a brewhouse to a pair of settling tanks, holding the wort in each of said tanks until the next subsequent batch of wort is fed from the brewhouse to the other of said tanks, draining the wort from the first tank and adjusting the flow rate of the wort being drained so that said wort is drained from said first tank slightly before the next subsequent batch of wort is fed from the brewhouse to said first tank, continuously passing the wort through a mechanical separator to substantially completely remove the suspended solid material and provide a stream of hot substantially clear wort, continuously flowing the clear hot wort through a series of evaporative effects in the form of a substantially continuous film in heat exchange relation with a heating medium to concentrate the wort to a solids content greater than 78% by weight, and thereafter cooling the concentrated wort to a temperature below 105° F.

7. In a continuous process of concentrating brewers' wort, the steps comprising continuously preheating a stream of substantially clear wort to a temperature in the range of 185° to 230° F., holding the preheated wort at said temperature range for a period of up to 30 minutes, continuously flowing the preheated wort through a series of evaporative effects in the form of a substantially continuous film in heat exchange relation with a heating medium to concentrate the wort to a solids concentrate greater than 78% by weight, and thereafter immediately cooling the concentrated wort to a temperature below 105° F. in a period less than 10 minutes.

8. In a continuous process of concentrated brewers' wort, the steps comprising continuously preheating a stream of clear wort to a temperature in the range of 185° to 230° F., evaporating the preheated wort by passing the wort through a series of evaporative effects in the form of a substantially continuous film in heat exchange relation with a heating medium to concentrate the wort to a solids content greater than 78% by weight and provide a vaporized component, separating the concentrated wort from the vaporized component after each step of evaporation, cooling the concentrated wort to a temperature below 105° F., and maintaining the flow of wort through said system at a rate sufficient to perform said steps of preheating, evaporating, separating and cooling in a period less than 10 minutes.

9. The process of claim 8, and including the step of utilizing the vaporized components from one evaporative effect as the heating source in the next subsequent evaporative effect.

10. In a continuous process of concentrating brewers' wort, the steps comprising continuously preheating a stream of clear wort to a temperature in the range of 185° to 230° F., evaporating the preheated wort by passing the wort through a series of evaporative effects in the form of a substantially continuous film in heat exchange relation with a heating medium to concentrate the wort to a solids content greater than 78% by weight, measuring the density of the wort as it is discharged from the last of the series of evaporative effects, utilizing the density measurement to regulate the rate of evaporation in the last of said series of evaporative effects to maintain a substantially uniform concentration of said wort, and thereafter cooling the concentrated wort to a temperature below 105° F.

11. In a continuous process of concentrating brewers' wort, the steps comprising continuously preheating a stream of clear wort to a temperature in the range of 185° to 230° F., evaporating the preheated wort by passing the wort through a series of evaporative effects in the form of a substantially continuous film in heat exchange relation with a heating medium to concentrate the wort to a solids content greater than 78% by weight, continuously measuring the density of the stream of wort after the wort has been discharged from the last of said series of evaporative effects, utilizing the measurement of density to control the flow of wort and the flow of said heating medium to the last of said evaporative effects to thereby obtain a substantially uniform concentration of wort, and thereafter cooling the concentrated wort.

12. In a continuous process of concentrating brewers' wort, the steps comprising flowing a stream of clear wort through a preheater to heat the wort to a temperature in the range of 185° to 230° F., continuously flowing the preheated wort through a holding tank to maintain the wort at said temperature for a period of up to 6 minutes, continuously flowing the preheated wort through a series of evaporative effects in the form of a substantially continuous film in heat exchcange relation with a heating medium to concentrate the wort to a solids content greater than 78% by weight, thereafter immediately cooling the concentrated wort to a temperature below 105° F., and maintaining the flow of said wort through said preheater, holding tank, evaporators and cooler at a rate sufficient to perform said steps of preheating, holding evaporating and cooling in a period less than 10 minutes.

13. In a process of concentrating brewers' wort, the steps comprising passing hot wort substantially free of suspended solids through a series of evaporative effects in the form of a substantially continuous film in heat exchange relation with a heating medium in a period of less than 10 minutes to concentrate the wort to a solids content greater than 78% by weight, maintaining each successive evaporative effect in said series at a lesser pressure than the previous evaporative effect, flowing the concentrated wort through a chamber having a pressure less than the pressure of the last evaporative effect of said series to partially cool said wort, and substantially immediately thereafter flowing the concentrated wort in heat exchange relation with a cooling medium to cool the wort to a temperature below 105° F.

14. In a continuous process of concentrating brewers' wort, the steps comprising continuously preheating a stream of substantially clear wort to a temperature in the range of 185° to 230° F., holding the preheated wort at said temperature range for a period of up to 6 minutes, continuously flowing the preheated wort through a series of evaporative effects in the form of a substantially continuous film in heat exchange relation with a heating medium to concentrate the wort to a solids concentration greater than 78% by weight, maintaining each successive evaporative effect in said series at a lesser pressure than the previous evaporative effect, and continuously cooling the stream of concentrated wort to a temperature below 105° F.

15. In a continuous process of concentrating brewers' wort, the steps comprising continuously flowing a stream of clear wort in heat exchange relation with a heating medium to preheat the wort to a temperature in the range of 185° to 230° F., continuously flowing the preheated wort through a series of evaporative effects in heat exchange relation with a heating medium to concentrate the wort to a solids content greater than 78% by weight, and thereafter continuously flowing the concentrated wort in heat exchange relation with a cooling medium to cool the concentrated wort to a temperature below 105° F.

16. In an apparatus for concentrating brewers' wort, a closed flow system to conduct a stream of wort, said system including in series, in the direction of wort flow, a settling tank, mechanical means for separating suspended trub material from the wort and providing a clear wort, preheating means for preheating the clear wort to a temperature in the range of 185° to 230° F., evaporating means including a series of evaporators for concentrating the wort to a solids content greater than 78% by weight, and cooling means for cooling the concentrated wort to a temperature below 105° F.; and means for continuously flowing the wort through said system.

17. The apparatus of claim 16 and including density measuring means located between said evaporating means and said cooling means for measuring the density of the concentrated wort, and means responsive to the density of of said concentrated wort for controlling the evaporation rate in the last of said series of evaporators.

18. The apparatus of claim 16, and including means for introducing hop constituents into said flow stream of wort, said means being connected to said flow system between said preheating means and said evaporating means.

19. The apparatus of claim 18 and including a holding tank located in said flow system between said preheating means and said evaporating means, and valve means connected in said flow system for controlling the rate of flow of wort through said holding tank.

References Cited by the Examiner

UNITED STATES PATENTS

| | | | |
|---|---|---|---|
| 2,151,079 | 3/1939 | Rowen | 210—2 |
| 2,287,995 | 6/1942 | Haugh | 159—44 X |
| 2,331,556 | 10/1943 | Lindgren | 99—52 |
| 2,360,445 | 10/1944 | Quasebarth | 159—43 |
| 2,562,739 | 7/1951 | Risberg | 159—24 |
| 2,888,449 | 5/1959 | Borck | 159—17 |
| 2,960,160 | 11/1960 | Goodman | 159—28 X |
| 3,102,813 | 9/1963 | Shore et al. | 99—52 |
| 3,152,947 | 10/1964 | Monick et al. | 159—28 X |
| 3,203,466 | 8/1965 | Eckstrom | 159—17 X |

NORMAN YUDKOFF, *Primary Examiner.*

J. SOFER, *Assistant Examiner.*